US008417268B1

(12) United States Patent
Halferty et al.

(10) Patent No.: US 8,417,268 B1
(45) Date of Patent: Apr. 9, 2013

(54) METHODS AND SYSTEMS FOR DISABLING TEXT MESSAGING

(75) Inventors: Clark D. Halferty, Lees Summit, MO (US); Andrew M. Wurtenberger, Olathe, KS (US); Caleb S. Hyde, Kansas City, MO (US); Christopher M. Yenney, Ashburn, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 395 days.

(21) Appl. No.: 12/781,427

(22) Filed: May 17, 2010

(51) Int. Cl.
*H04W 4/00* (2009.01)

(52) U.S. Cl.
USPC ........ 455/466; 455/410; 455/411; 455/569.2; 455/575.9; 455/556.2

(58) Field of Classification Search .................. 455/466, 455/410, 411, 550.1, 575.9, 569.1, 569.2, 455/456.4, 556.2
See application file for complete search history.

(56) References Cited

U.S. PATENT DOCUMENTS

| | | | |
|---|---|---|---|
| 6,256,558 B1 | 7/2001 | Sugiura et al. | |
| 6,353,778 B1 | 3/2002 | Brown | |
| 6,690,940 B1 | 2/2004 | Brown et al. | |
| 6,973,333 B1* | 12/2005 | O'Neil | 455/569.2 |
| 7,142,666 B1 | 11/2006 | Bates et al. | |
| 7,181,229 B2 | 2/2007 | Singh et al. | |
| 7,505,784 B2* | 3/2009 | Barbera | 455/557 |
| 7,505,785 B2* | 3/2009 | Callaghan et al. | 455/557 |
| 7,856,203 B2* | 12/2010 | Lipovski | 455/1 |
| 8,060,138 B2* | 11/2011 | Fux et al. | 455/556.2 |
| 8,217,800 B2* | 7/2012 | Vander Veen et al. | 340/670 |
| 8,258,919 B2* | 9/2012 | Corradino et al. | 340/5.52 |
| 2002/0138271 A1 | 9/2002 | Shaw | |
| 2003/0109246 A1 | 6/2003 | Shimizu et al. | |
| 2005/0255874 A1 | 11/2005 | Stewart-Baxter et al. | |
| 2005/0283726 A1 | 12/2005 | Lunati | |
| 2005/0288024 A1 | 12/2005 | Song | |
| 2006/0058036 A1 | 3/2006 | Watanabe et al. | |
| 2006/0099940 A1 | 5/2006 | Pfleging et al. | |
| 2007/0032225 A1 | 2/2007 | Konicek et al. | |

(Continued)

FOREIGN PATENT DOCUMENTS

| | | |
|---|---|---|
| EP | 1 589 727 | 10/2005 |
| GB | 2420059 | 5/2010 |
| JP | 2003-316252 | 11/2003 |

OTHER PUBLICATIONS

Advisory Action mailed Nov. 1, 2011 for U.S. Appl. No. 12/263,964.

(Continued)

*Primary Examiner* — Sharad Rampuria

(57) ABSTRACT

Methods and systems are provided for disabling text-entry capabilities. In one embodiment, a mobile station detects that it is being supported by a given single hand of a user and not by two hands of the user. The mobile station also detects that it is being operated by the single given hand of the user and not by two hands of the user. Optionally, the mobile station also determines that it is moving at greater than a threshold rate or detects more than a threshold degradation in text-entry proficiency. In response to detecting at least that the mobile station is being supported and operated by the single given hand of the user and not by two hands of the user, the mobile station disables one or more text-entry capabilities.

23 Claims, 5 Drawing Sheets

U.S. PATENT DOCUMENTS

| | | | |
|---|---|---|---|
| 2007/0072553 | A1 | 3/2007 | Barbera |
| 2009/0098855 | A1 | 4/2009 | Fernandez et al. |
| 2009/0111422 | A1 | 4/2009 | Bremer et al. |
| 2010/0113073 | A1 | 5/2010 | Schlesener et al. |
| 2010/0201478 | A1* | 8/2010 | Veen et al. ............... 340/3.1 |
| 2010/0297929 | A1* | 11/2010 | Harris ........................ 455/1 |
| 2011/0077032 | A1* | 3/2011 | Correale et al. ........... 455/466 |
| 2011/0159842 | A1* | 6/2011 | Vander Veen et al. ...... 455/410 |

OTHER PUBLICATIONS

International Search Report and Written Opinion of the International Search Authority from International Application No. PCT/US09/63119, dated Feb. 12, 2010.

EPO Published Abstract of Japanese Publication No. 2003 316252, published Nov. 7, 2003.

Unpublished U.S. Appl. No. 12/263,964, filed Nov. 3, 2008 in the name of Schlesener et al., entitled "Methods and Systems for Disabling Text Messaging with Driving".

Halfbakery, "Cell Phone Use Control," http://www.halfbakery.com/idea/Cell_20Phone_20Use_20Control, printed from the World Wide Web on Nov. 9, 2007.

Halfbakery, "Cell Phone Block While Driving," http://www.halfbakery.com/idea/Cell_20Phone_20Block_20While_20Driving, printed from the World Wide Web on Apr. 8, 2010.

AppScout: More Mobile Software, "Textecution Saves Lives by Killing Text, Internet While Driving," http://www.appscout.com/mobile_software/more.php?p=1, printed from the World Wide Web on Jan. 16, 2009.

Johnson, "TXTBlocker Lets Users Disable Texting and Other Features While Driving," http://www.hothardware.com/.../TXTBlocker-Lets_..., printed from the World Wide Web on Jan. 4, 2010.

"ZoomSafer eliminates the temptation to text while driving and keeps you connected via hands-free services", http://www.zoomsafter.com/personal.aspx, printed from the World Wide Web on Jan. 4, 2010.

Final Office Action mailed Aug. 15, 2011 for U.S. Appl. No. 12/263,964.

Non-Final Office Action from U.S. Appl. No. 12/263,964, mailed Feb. 25, 2011.

\* cited by examiner

METHODS AND SYSTEMS FOR DISABLING TEXT MESSAGING

BACKGROUND

1. Technical Field

The present disclosure relates to wireless communications, and, more particularly, to features and services, such as text messaging, of mobile stations.

2. Description of Related Art

Many people use mobile stations, such as cell phones and personal digital assistants, to communicate with cellular wireless networks, which typically provide communication services such as voice, text messaging, and packet-data communication. These mobile stations and networks typically communicate with each other over a radio frequency (RF) air interface according to a wireless protocol. Mobile stations typically conduct wireless communications with one or more base transceiver stations (BTSs), each arranged to send communications to and receive communications from mobile stations over the RF air interface.

Each BTS is in turn communicatively connected with a network entity known as a base station controller (BSC) (sometimes referred to as a radio network controller (RNC)), which controls one or more BTSs and acts as a conduit between the one or more BTSs and one or more switches or gateways, such as a mobile switching center (MSC) and/or a packet data serving node (PDSN). The one or more switches or gateways may then interface with one or more signaling and/or transport networks. For example, an MSC may interface with the well-known public switched telephone network (PSTN). As another example, a PDSN may interface with one or more core packet data networks and/or the global Internet. As such, mobile stations can typically communicate over the one or more signaling and/or transport networks from anywhere inside the coverage area of one or more BTSs, via the BTS(s), a BSC, and a switch or gateway such as an MSC and/or a PDSN.

OVERVIEW

Most currently-available mobile stations provide their users with several text-entry capabilities including, as examples, text messaging, e-mail, dialing a telephone number, web browsing, and scrolling through an address book stored on the mobile station. Text-entry capabilities typically make use of a touchscreen, keypad, keyboard, stylus, and/or any other input mechanism(s).

In the case of text messaging, for example, a user may launch a text-messaging application, select one or more recipients of a message, enter the substance (i.e. body) of the message, and then invoke a Send command. At that point, the mobile station responsively sends the entered message to the one or more recipients via one or more network entities, such as but not limited to a Short Message Service Center (SMSC). When a mobile station receives a text message, the mobile station typically alerts its user with some sort of audible, visible, and/or tactile (e.g. vibrating) alert, at which point the user can display and read the message.

Text messaging and other text-entry capabilities of mobile stations have become extremely popular, and become more so every day. For example, users of mobile stations make use of text-entry capabilities at all times of the day, and while doing all sorts of activities. Again, in the case of text messaging, users send and receive text messages in school, at work, on the train, on the bus, etc. Users even send text messages while driving, which can often create dangerous situations on the road for those users, their passengers, passengers of other vehicles, pedestrians, etc. It is simply often not possible for users to dedicate sufficient focus to operating a vehicle while also devoting enough focus to successfully compose and send text messages. The same sort of safety concerns arise as a result of users engaging in other types of text-entry while driving.

As use of text messaging (and other types of text-entry) continues to become more and more popular, the danger to society of users engaging in text-entry activities while driving increases commensurately. As such, a number of state and local governments have outlawed the practice.

In accordance with the presently-described methods and systems, a mobile station detects conditions that indicate that its user is—or likely is—operating a vehicle (car, truck, motorcycle, bicycle, etc.), and responsively disables one or more of the mobile station's text-entry capabilities. For example, if a user is operating a vehicle, the user is most likely using one hand to operate the vehicle and one hand to support and operate the mobile station. The mobile station may monitor the number of hands a user is currently using to support and operate the mobile station. Such monitoring may be performed using, for instance, one or more touch sensors on the mobile station.

Additionally, if a user is operating a vehicle, the mobile station is moving at the speed of a vehicle. Thus, the mobile station may also monitor its motion in order to determine if it is moving at greater than a threshold rate. The mobile station may monitor its motion according to a number of handoffs during a particular time period, by use of GPS or other location technology, with one or more internal or external motion sensors such as accelerometers, by using any other motion-detecting technology described herein, and/or by using any other technology now known or later developed for detecting a degree of motion of a mobile station, including technologies performed by the mobile station without assistance, technologies that involve one or more network or other entities, and/or any other suitable means or technologies.

In accordance with at least one embodiment, if the mobile station detects both that (a) the mobile station is being supported by a given single hand of a user and not by two hands of the user and (b) the mobile station is being operated by the given single hand of the user and not by two hands of the user, the mobile station responsively disables one or more text-entry capabilities. Text-entry capabilities may include an ability of the mobile station to dial a phone number, search an address book, or use applications such as email, web browsing, and text messaging, among many other examples.

The mobile station detecting that the mobile station is being supported and operated by a given single hand of a user and not by two hands of the user may involve detecting that exactly one of a plurality of touch sensors on the mobile station is being touched. Additionally, this may involve detecting that exactly one of the plurality of touch sensors on the mobile station is being touched for at least a predetermined amount of time.

In at least one embodiment, the mobile station's one or more text-entry capabilities may remain disabled until the mobile station determines that its current motion is less than or equal to a given threshold rate, perhaps equal to or substantially equal to zero. In at least one embodiment, the mobile station may require that this zero or slow-motion condition persist for a threshold time period before any text-entry capabilities are re-enabled. Thus, in times where the degree of motion is sufficient to conclude that the mobile station is in a moving vehicle, the mobile station will monitor the user's support and operation of the mobile station. If the mobile station detects that the mobile station is once again being both supported and operated by a given hand of the user and not also by the other hand of the user, and that the mobile station is moving at greater than a threshold speed, the mobile station will disable one or more text-entry capabilities, perhaps until the degree of motion no longer indicates vehicle motion.

It should be noted that the above overview is intended to be illustrative and not limiting. Additional and/or different features may be present in at least one embodiment. In at least one embodiment, analysis of support and operation of the mobile station as well as motion of the mobile station may be performed in whole or in part by one or more network entities separate from the mobile station. Furthermore, any description of a mobile station, base station, or other network element communicating or providing service according to any particular protocol is by way of example and not limitation; any suitable wireless protocol(s) may be used, such as CDMA, TDMA, AMPS, GSM, GPRS, UMTS, EDGE, EV-DO, WiMax (e.g. IEEE 802.16), LTE, microwave, satellite, MMDS, Wi-Fi (e.g. IEEE 802.11), Bluetooth, infrared, and/or any other now known or later developed.

BRIEF DESCRIPTION OF THE DRAWINGS

Various embodiments are described herein with reference to the following drawings, wherein like numerals denote like entities.

DETAILED DESCRIPTION

1. Examples of Architecture a. Example Communication System

Figure 1:
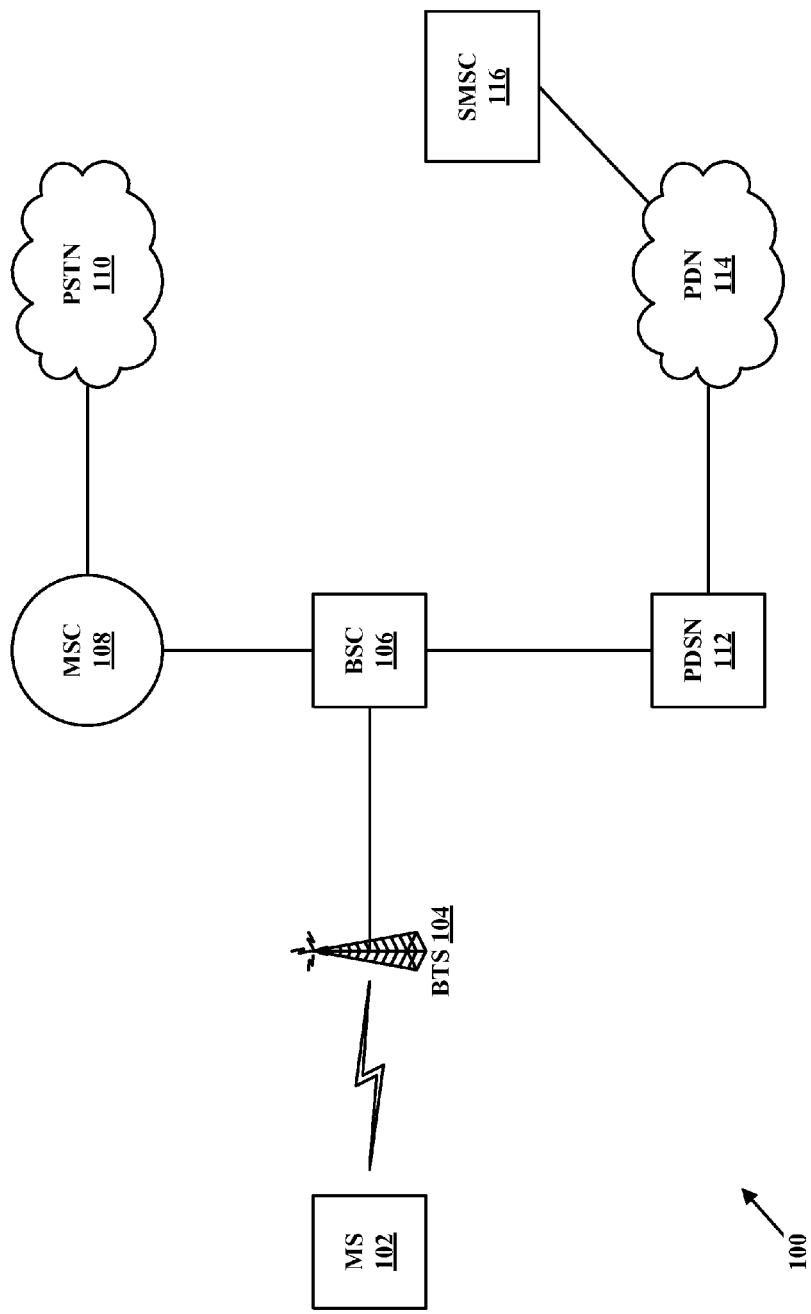
FIG. 1 is a simplified block diagram of a communication system, in accordance with at least one embodiment.

FIG. 1 is a simplified block diagram of a communication system, in accordance with at least one embodiment. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, a communication system 100 includes a mobile station (MS) 102, a base transceiver station (BTS) 104, a base station controller (BSC) 106, a mobile switching center (MSC) 108, a public switched telephone network (PSTN) 110, a packet data serving node (PDSN) 112, a packet-data network (PDN) 114, and a short message service center (SMSC) 116. And additional entities could be present as well or instead. For example, there could be additional mobile stations in communication with BTS 104; furthermore, there could be additional entities in communication with PSTN 110 and/or PDN 114. Also, there could be one or more devices and/or networks making up at least part of one or more of the communication links. For example, there could be one or more routers, switches, or other devices or networks on the link between PDSN 112 and PDN 114.

Mobile station 102 may be any mobile device arranged to carry out the mobile-station functions described herein. As such, mobile station 102 may include a user interface, a wireless-communication interface, a processor, and data storage comprising instructions executable by the processor for carrying out those mobile-station functions. Mobile station 102 is further described below in connection with FIG. 2.

BTS 104 may be any network element arranged to carry out the BTS functions described herein. As such, BTS 104 may include a communication interface, a processor, and data storage comprising instructions executable by the processor to carry out those BTS functions. The communication interface may include one or more antennas, chipsets, and/or other components for providing one or more coverage areas such as cells and sectors, for communicating with mobile stations, such as mobile station 102, over an air interface. The communication interface may be arranged to communicate according to one or more protocols mentioned herein and/or any others now known or later developed. The communication interface may also include one or more wired and/or wireless interfaces for communicating with at least BSC 106.

BSC 106 may be any network element arranged to carry out the BSC functions described herein. As such, BSC 106 may include a communication interface, a processor, and data storage comprising instructions executable by the processor to carry out those BSC functions. The communication interface may include one or more wired and/or wireless interfaces for communicating with at least BTS 104, MSC 108, and PDSN 112. In general, BSC 106 functions to control one or more BTSs such as BTS 104, and to provide one or more BTSs such as BTS 104 with connections to devices such as MSC 108 and PDSN 112.

MSC 108 may be any networking element arranged to carry out the MSC functions described herein. As such, MSC 108 may include a communication interface, a processor, and data storage comprising instructions executable by the processor to carry out those MSC functions. The communication interface may include one or more wired and/or wireless interfaces for communicating with at least BSC 106 and PSTN 110. In general, MSC 108 functions as a switching element between PSTN 110 and one or more BSCs such as BSC 106, facilitating communication between mobile stations and PSTN 110, which may be the well-known public switched telephone network.

PDSN 112 may be any networking element arranged to carry out the PDSN functions described herein. As such, PDSN 112 may include a communication interface, a processor, and data storage comprising instructions executable by the processor for carrying out those PDSN functions. The communication interface may include one or more wired and/or wireless interfaces for communicating with at least BSC 106 and PDN 114. In general, PDSN 112 functions as a network access server between PDN 114 and BSCs such as BSC 106, facilitating packet-data communication between mobile stations and PDN 114.

PDN 114 may include one or more wide area networks, one or more local area networks, one or more public networks such as the Internet, one or more private networks, one or more wired networks, one or more wireless networks, and/or one or more networks of any other type. In one example, PDN 114 may include both the Internet and a private core packet-data network operated by a wireless carrier that operates BTS 104, BSC 106, etc. Devices in communication with PDN 114 may exchange data using a packet-switched protocol such as the Internet Protocol (IP), and may be identified by an address such as an IP address.

SMSC 116 may be any networking element arranged to carry out the SMSC functions described herein. As such, SMSC 116 may include a communication interface, a processor, and data storage comprising instructions executable by the processor for carrying out those SMSC functions. The communication interface may include one or more wired and/or wireless interfaces for communicating with at least PDN 114 (and/or one or more of MSC 108, PSTN 110, etc). In general, SMSC 116 functions to enable SMS messaging between and among various entities by providing store-and-forward services with respect to SMS messages, along with one or more other suitable services for enabling the aforementioned SMS communication. Note that an entity other than an SMSC may be used instead or as well to enable text-messaging communication regardless of protocol.

b. Example Mobile Station

Figure 2:
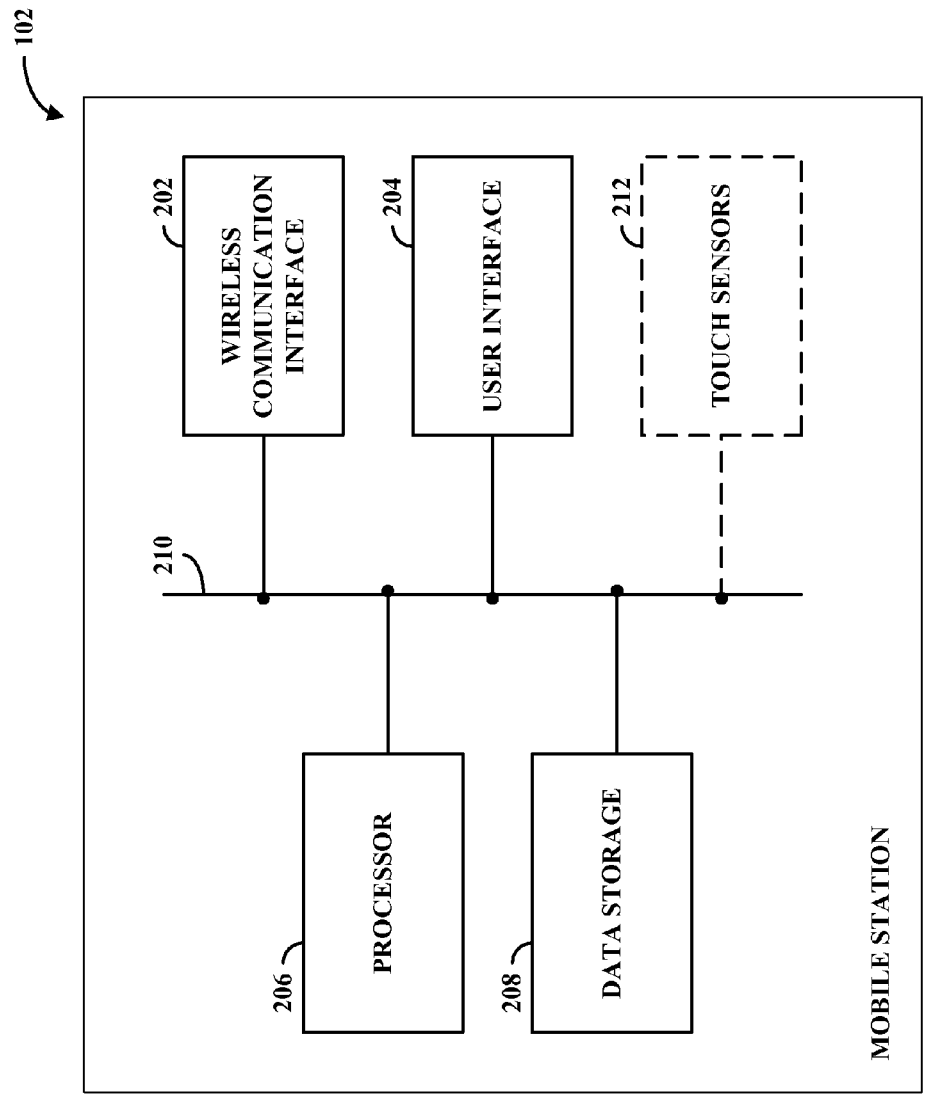
FIG. 2 is a simplified block diagram of a mobile station, in accordance with at least one embodiment.

FIG. 2 is a simplified block diagram of a mobile station, in accordance with at least one embodiment. As shown, the mobile station 102 includes a wireless-communication interface 202, a user interface 204, a processor 206, data storage 208, and optionally (as indicated by dashed lines) touch sensors 212, all of which may be communicatively linked together by a system bus, network, and/or other connection mechanism 210.

Wireless-communication interface 202 functions to facilitate air-interface communication with BTS 104. The wireless-communication interface 202 may comprise an antenna and a chipset for communicating with one or more base stations over an air interface. As an example, the chipset could be one that is suitable for CDMA communication. The chipset or wireless-communication interface in general may also or instead be arranged to communicate according to one or more other types of wireless communication (e.g. protocols) mentioned herein and/or any others now known or later developed.

User interface 204 may include one or more components for receiving input from a user of the mobile station 102, as well as one or more components for providing output to a user of the mobile station 102. The user interface 204 may include buttons, a touchscreen, a microphone, and/or any other elements for receiving inputs, as well as a speaker, one or more displays, and/or any other elements for communicating outputs. Further, the user interface 204 may include analog/digital conversion circuitry to facilitate conversion between analog user input/output and digital signals on which the mobile station 102 can operate.

Processor 206 may comprise one or more general-purpose processors (such as INTEL processors or the like) and/or one or more special-purpose processors (such as digital-signal processors or application-specific integrated circuits). To the extent processor 206 includes more than one processor, such processors could work separately or in combination. Further, the processor 206 may be integrated in whole or in part with the with wireless-communication interface 204 and/or with other components.

Data storage 208, in turn, may comprise one or more volatile and/or one or more non-volatile storage components, such as optical, magnetic, and/or organic storage, and data storage 208 may be integrated in whole or in part with processor 206. In an embodiment, data storage 208 may contain program logic executable by processor 206 to carry out various mobile-station functions described therein.

Touch sensors 212 may function to detect contact with, e.g., a user's hand. The mobile station 102 may be equipped with more than one touch sensor, such that the number of sensors being touched could provide an indication of the number of hands supporting the mobile station 102. In one embodiment, detecting that the mobile station 102 is being both supported and operated by a given single hand of a user and not by two hands of the user comprises determining that exactly one of the more than one touch sensors 212 on the mobile station 102 is being touched, though certainly many other such implementations are possible as well.

2. Examples of Operation a. A First Example Method

Figure 3:
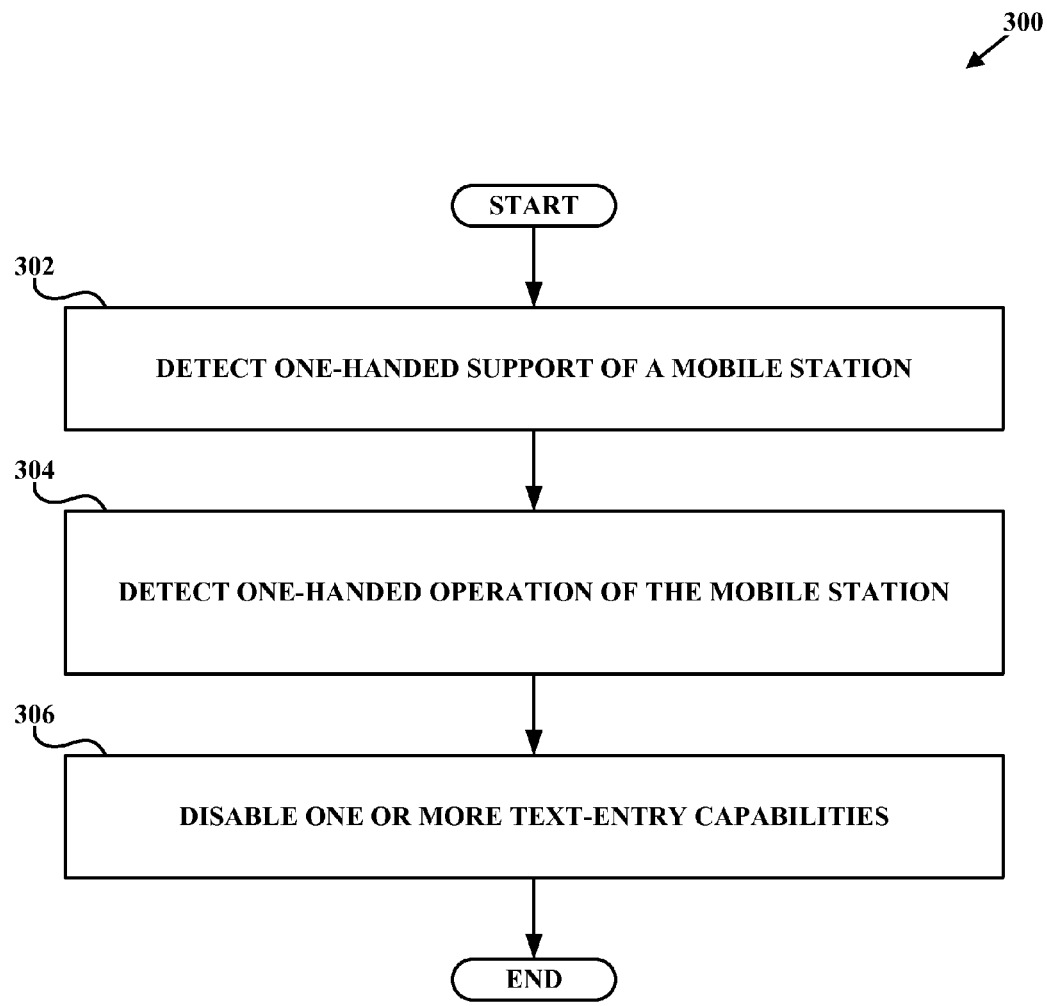
FIG. 3 is a flowchart of a method, in accordance with at least one embodiment.

FIG. 3 depicts a flowchart of a method, in accordance with at least one embodiment. Note that method 300 is described as being carried out by a mobile station, and by mobile station 102 in particular. In at least one embodiment, method 300 may be carried out by a mobile station in cooperation with one or more other entities described herein and/or one or more other suitable entities of any type.

As shown in FIG. 3, method 300 begins at step 302, when mobile station 102 detects that it is being supported by a single given hand of a user and not by two hands of a user. At step 304, mobile station 102 detects that it is being operated by the same single given hand of the user and not by two hands of the user. In an embodiment, steps 302 and 304 may involve the mobile station 102 determining that exactly one of the more than one touch sensors 212 on the mobile station 102 is being touched. In an embodiment, steps 302 and 304 may involve the mobile station 102 detecting that it has been supported and operated by a given single hand of the user and not by two hands of the user for at least a predetermined amount of time. In an embodiment, steps 302 and 304 may involve the mobile station 102 detecting more than a threshold degradation in text-entry proficiency, which may include detecting more than a threshold decrease in typing speed with respect to the user's normal or typical typing speed, more than a threshold increase with respect to misspelling words or backspacing, and/or one or more other negative changes in typing proficiency with respect to the user's normal proficiency.

At step 306, in response to detecting (in steps 302 and 304) that the mobile station 102 is being both supported and operated by the single given hand of the user and not by two hands of the user, mobile station 102 disables one or more text-entry capabilities. In an embodiment, step 306 involves mobile station 102 disabling the one or more text-entry capabilities for a predetermined amount of time.

In at least one embodiment, text-entry capabilities may include, for example, dialing a phone number and searching an address book. In at least one embodiment, text-entry capabilities may include applications such as, for example, e-mail, instant messaging, web browsing, and/or text messaging. Other text-entry capabilities are possible as well or instead.

In at least one embodiment, step 306 may involve mobile station 102 disabling one or more modes of text entry such as, for example, T9 or multi-tap text entry, text entry via a hardware keyboard, text entry via a soft keyboard, and/or one or more other modes of text entry. Step 306 may involve the mobile station 102 disabling at least one of (a) its ability to receive text-message input from a user and (b) its ability to transmit entered text messages.

In at least one embodiment, mobile station 102 may, in response to detecting that the mobile station 102 is being both supported and operated by a single given hand of a user and not by two hands of the user, disable a text-message-receiving capability. In at least one embodiment, the mobile station 102 may disable visible and/or enable audible presentation of received text messages. And mobile station 102 may also or instead store any received text messages for later viewing.

In at least one embodiment, mobile station 102 may, in response to detecting that the mobile station 102 is being both supported and operated by a given single hand of a user and not by two hands of the user, cause an alert to be sent to at least one of a second mobile station, a phone number, and an e-mail address. In at least one embodiment, such an alert may be sent to at least one of an originating device and an originating address of a communication received by the mobile station 102 while the one or more text-entry capabilities are disabled. The alert may indicate that the mobile station 102 has disabled the one or more text-entry capabilities in response to detecting that the mobile station 102 is being supported and operated by a given single hand of a user and not by two hands of the user.

In at least one embodiment, mobile station 102 may itself send such an alert. In at least one embodiment, mobile station 102 may send a request to one or more network entities, causing one or more such alerts to be sent. And still other possibilities exist as well.

b. A Second Example Method

Figure 4:
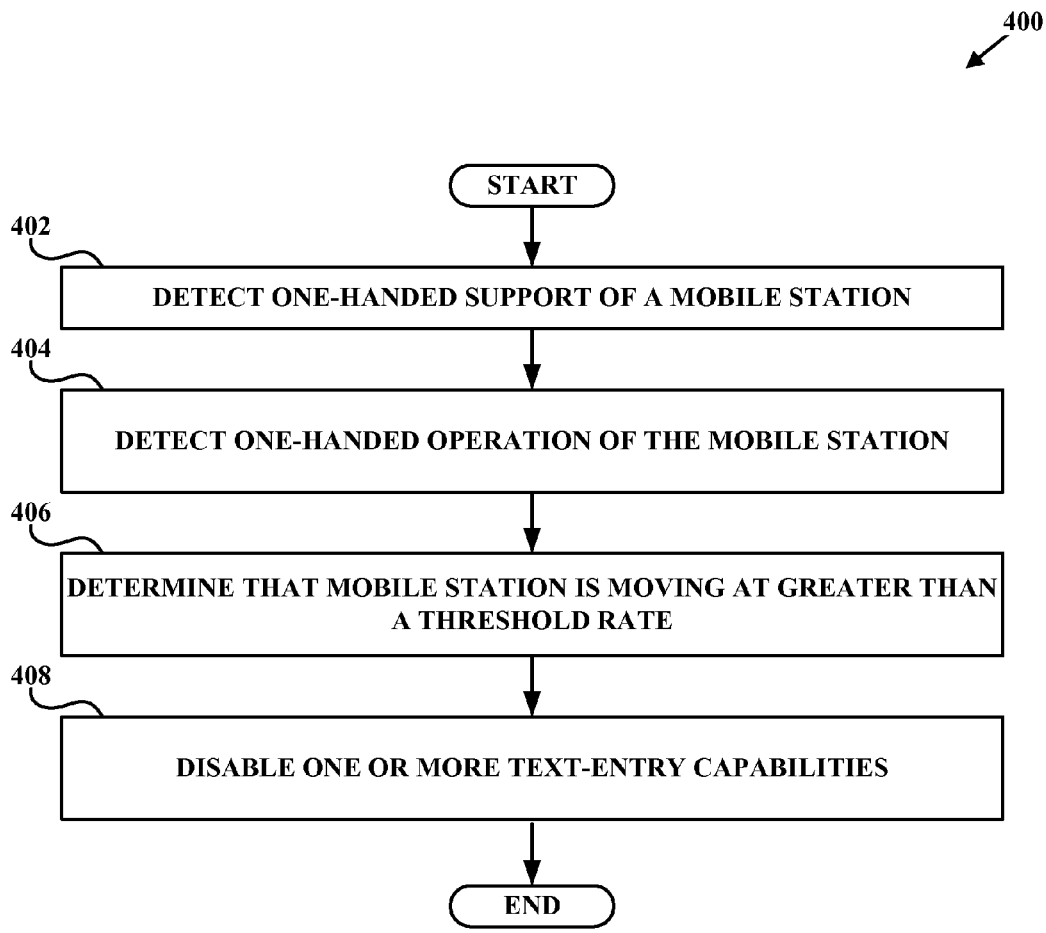
FIG. 4 is a flowchart of a method, in accordance with at least one embodiment.

FIG. 4 is a flowchart of a method, in accordance with at least one embodiment. In particular, FIG. 4 depicts a method 400, which may be carried out by a mobile station such as mobile station 102. Method 400 is similar to method 300, and thus is not described in as great of detail. And it is explicitly contemplated that any possibilities and permutations discussed herein with respect to any embodiment may be just as well applied to any other, such as but not limited to that depicted as method 400.

As shown in FIG. 4, method 400 begins at step 402, when mobile station 102 detects that it is being supported by a single given hand of a user and not by two hands of a user. At step 404, mobile station 102 detects that it is being operated by the same single given hand of the user and not by two hands of the user.

At step 406, the mobile station 102 determines that it is moving at greater than a threshold rate. In an embodiment, step 406 may involve mobile station 102 detecting more than a threshold number of handoffs during a particular time period. In an embodiment, step 406 may involve mobile station 102 determining its translational rate of motion (perhaps using a positioning technology such as GPS), and further determining that its translational rate of motion exceeds the threshold rate. In an embodiment, step 406 may involve mobile station 102 using a motion sensor (such as an internal accelerometer, for example).

At step 408, in response to the mobile station 102 (i) detecting that it is being both supported and operated by the given single hand of the user and not by two hands of the user and (ii) determining that the mobile station 102 is moving at greater than a threshold rate, the mobile station 102 disables one or more text-entry capabilities. In at least one embodiment, the mobile station 102 disables the one or more text-entry capabilities until detecting that it is no longer moving at greater than the threshold rate. In at least one embodiment, the mobile station 102 disables the one or more text-entry capabilities until detecting that it has not been moving at greater than the threshold rate for at least a predetermined amount of time.

c. A Third Example Method

Figure 5:
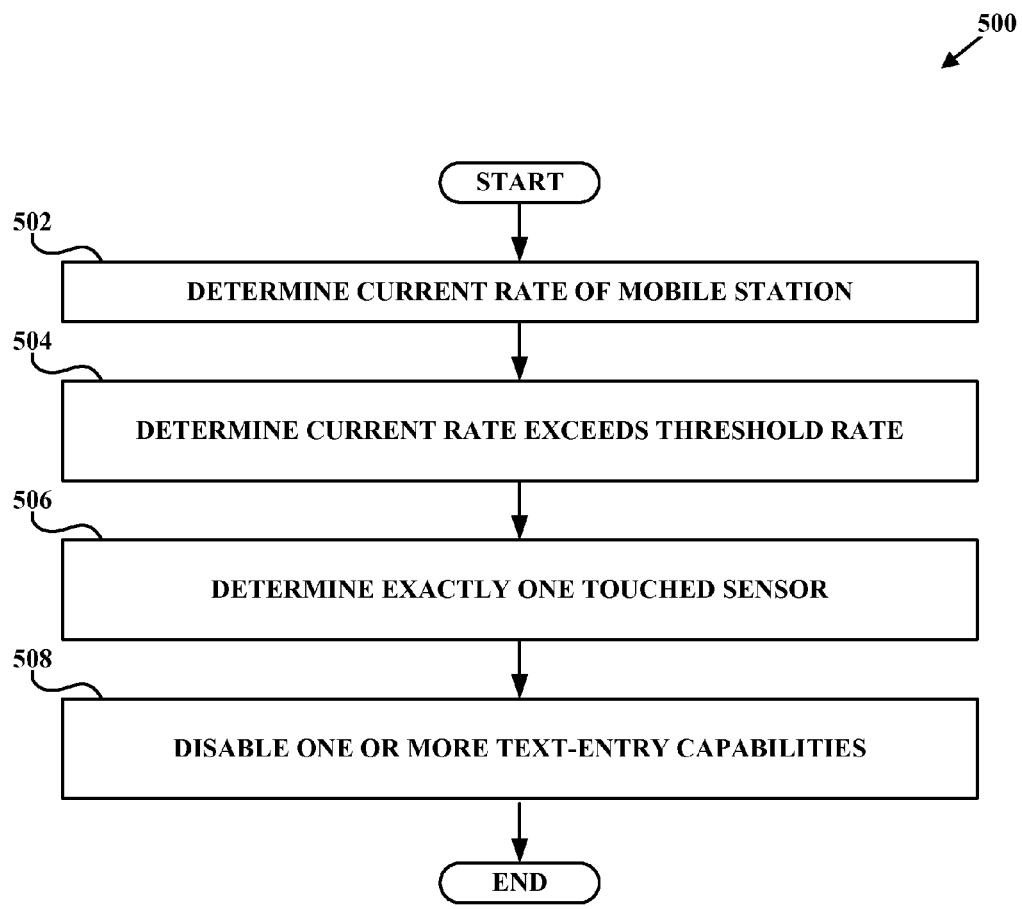
FIG. 5 is a flowchart of a method, in accordance with at least one embodiment.

FIG. 5 is a flowchart of a method, in accordance with at least one embodiment. In particular, FIG. 5 depicts a method 500, which may be carried out by a mobile station such as mobile station 102. In at least one embodiment, the method may be carried out by another network entity, such as a base station, some other network entity, or any combination thereof.

Step 502 involves determining a current rate of movement of a mobile station 102. Step 504 involves determining that the current rate of movement of the mobile station 102 exceeds a threshold rate of movement. Step 506 involves, in response to determining that the current rate of movement of the mobile station 102 exceeds the threshold rate, determining how many among a number of touch sensors 212 on the mobile station 102 are currently being touched. Step 508 involves disabling an ability of the mobile station 102 to accept text entry when it is determined that exactly one of the touch sensors 212 on the mobile station 102 is currently being touched.

3. Conclusion

Various embodiments have been described above. Those skilled in the art will understand, however, that changes and modifications may be made to those examples without departing from the scope of the claims.

The invention claimed is:

1. A method comprising:
 a mobile station detecting a triggering event, wherein detecting the triggering event comprises;
 (i) detecting that the mobile station is being supported by a given single hand of a user and not by two hands of the user and
 (ii) detecting that the mobile station is being operated by the same given single hand of the user and not by two hands of the user, wherein the mobile station is equipped with more than one touch sensor, and wherein detecting that the mobile station is being supported and operated by the given single hand of the user and not by two hands of the user comprises determining that exactly one of the more than one touch sensors on the mobile station is being touched; and
 in response to detecting the triggering event, the mobile station (i) disabling one or more text-entry capabilities and (ii) causing an alert to be sent to at least one of an originating device and an originating address of a communication received by the mobile station while the one or more text-entry capabilities are disabled, wherein the alert indicates that the mobile station has disabled the one or more text-entry capabilities.

2. The method of claim 1, wherein detecting the triggering event further comprises detecting that the mobile station has been supported and operated by the given single hand of the user and not by two hands of the user for at least a predetermined amount of time.

3. The method of claim 1, wherein detecting the triggering event further comprises the mobile station determining that it is moving at greater than a threshold rate.

4. The method of claim 3, wherein the mobile station determining that it is moving at greater than the threshold rate comprises the mobile station detecting more than a threshold number of handoffs during a particular time period.

5. The method of claim 3, wherein the mobile station determining that it is moving at greater than the threshold rate comprises the mobile station using a positioning technology.

6. The method of claim 3, wherein the mobile station disabling the one or more text-entry capabilities comprises the mobile station disabling the one or more text-entry capabilities until the mobile station detects that it is no longer moving at greater than the threshold rate.

7. The method of claim 3, wherein the mobile station disabling the one or more text-entry capabilities comprises the mobile station disabling the one or more text-entry capabilities until the mobile station detects that it has not been moving at greater than the threshold rate for at least a predetermined amount of time.

8. The method of claim 1, wherein detecting the triggering event further comprises detecting more than a threshold degradation in text-entry proficiency.

9. The method of claim 1, wherein the mobile station disabling the one or more text-entry capabilities comprises the mobile station disabling the one or more text-entry capabilities for a predetermined amount of time.

10. The method of claim 1, wherein the mobile station disabling the one or more text-entry capabilities comprises disabling one or more modes of text entry.

11. The method of claim 10, wherein the one or more modes of text entry are selected from the group consisting of T9, multi-tap, text entry via a hardware keyboard, and text entry via a soft keyboard.

12. The method of claim 1, wherein the one or more text-entry capabilities are selected from the group consisting of dialing a phone number and searching an address book.

13. The method of claim 1, wherein the mobile station disabling the one or more text-entry capabilities comprises the mobile station disabling one or more applications.

14. The method of claim 13, wherein the one or more applications are selected from the group consisting of e-mail, instant messaging, web browsing, and text messaging.

15. The method of claim 14, wherein the mobile station disabling text messaging comprises the mobile station disabling at least one of (a) its ability to receive text-message input from a user and (b) its ability to transmit entered text messages.

16. The method of claim 1, wherein, further in response to detecting the triggering event, the mobile station disables a text-message-receiving capability.

17. The method of claim 1, wherein, further in response to detecting the triggering event, the mobile station disables visible presentation of received text messages.

18. The method of claim 1, wherein, further in response to detecting the triggering event, the mobile station enables audible presentation of received text messages.

19. The method of claim 1, wherein, further in response to detecting the triggering event, the mobile station causes a second alert to be sent to at least one of a second mobile station, a phone number, and an e-mail address, wherein the second alert indicates that the mobile station has disabled the one or more text-entry capabilities in response to detecting the triggering event.

20. A mobile station comprising:
a wireless-communication interface;
a processor; and
data storage having stored therein instructions executable by the processor for carrying out functions including:
  detecting a triggering event, wherein detecting the triggering event comprises;
    (i) detecting that the mobile station is being supported by a given single hand of a user and not by two hands of the user and
    (ii) detecting that the mobile station is being operated by the same given single hand of the user and not by two hands of the user, wherein the mobile station is equipped with more than one touch sensor, and wherein detecting that the mobile station is being supported and operated by the given single hand of the user and not by two hands of the user comprises determining that exactly one of the more than one touch sensors on the mobile station is being touched; and
  in response to detecting the triggering event, (i) disabling one or more text-entry capabilities and (ii) causing an alert to be sent to at least one of an originating device and an originating address of a communication received by the mobile station while the one or more text-entry capabilities are disabled, wherein the alert indicates that the mobile station has disabled the one or more text-entry capabilities.

21. A method comprising:
determining a current rate of movement of a mobile station;
determining that the current rate of movement of the mobile station exceeds a threshold rate of movement;
in response to determining that the current rate of movement of the mobile station exceeds the threshold rate of movement, determining how many among a number of touch sensors on the mobile station are currently being touched;
disabling an ability of the mobile station to accept text entry when exactly one of the touch sensors on the mobile station is currently being touched; and
causing an alert to be sent to at least one of an originating device and an originating address of a communication received by the mobile station while the ability of the mobile station to accept text entry is disabled, wherein the alert indicates that the ability of the mobile station to accept text entry is disabled.

22. The method of claim 21, carried out by a base station.

23. The method of claim 21, carried out by at least one network entity.

* * * * *